United States Patent [19]

Copenhafer et al.

[11] Patent Number: 5,283,054
[45] Date of Patent: Feb. 1, 1994

[54] PROCESS FOR PRODUCING SODIUM SALTS FROM BRINES OF SODIUM ORES

[75] Inventors: William C. Copenhafer, Yardley, Pa.; David E. Smith, Princeton, N.J.; Gerald F. Niedringhaus, Rock Springs, Wyo.

[73] Assignee: FMC Corporation, Philadelphia, Pa.

[21] Appl. No.: 40,059

[22] Filed: Mar. 30, 1993

[51] Int. Cl.$^5$ .................................. C22B 26/10
[52] U.S. Cl. ..................... 423/206.2 T; 23/302 T; 299/5; 423/421
[58] Field of Search ................ 423/206 T, 421; 23/302 T; 299/5

[56] References Cited

U.S. PATENT DOCUMENTS

| | | | |
|---|---|---|---|
| 1,853,275 | 4/1932 | Houghton et al. | |
| 2,049,249 | 7/1936 | Cunningham | 23/63 |
| 2,133,455 | 10/1938 | Keene et al. | 23/63 |
| 2,193,817 | 3/1940 | Houghton | 23/38 |
| 2,388,009 | 10/1945 | Pike | 23/38 |
| 2,625,384 | 4/1953 | Pike et al. | 262/3 |
| 3,028,215 | 4/1962 | Frint | 423/206 T |
| 3,050,290 | 8/1962 | Caldwell et al. | 262/3 |
| 3,113,834 | 12/1963 | Beecher et al. | 23/63 |
| 3,119,655 | 1/1964 | Frint et al. | 23/63 |
| 3,184,287 | 5/1965 | Gancy | 23/63 |
| 3,212,848 | 10/1965 | Tasiaux | 423/421 |
| 3,264,057 | 8/1966 | Miller | 23/63 |
| 3,451,767 | 6/1969 | Saeman et al. | 23/63 |
| 3,455,647 | 7/1969 | Gloster | 23/63 |
| 3,498,744 | 3/1970 | Frint et al. | 423/206 T |
| 3,870,780 | 3/1975 | Guptill | 423/206 |
| 3,953,073 | 4/1976 | Kube | 299/5 |
| 4,039,617 | 8/1977 | Kuo | 423/186 |
| 4,039,618 | 8/1977 | Gancy | 423/206 T |
| 4,401,635 | 8/1983 | Frint | 23/302 T |
| 4,498,706 | 2/1985 | Kardi et al. | 23/302 T |
| 4,869,882 | 9/1989 | Dome et al. | 423/206 T |
| 5,043,149 | 8/1991 | Frint et al. | 423/206 T |

*Primary Examiner*—Wayne Langel
*Attorney, Agent, or Firm*—Frank Ianno; Robert L. Andersen

[57] ABSTRACT

A process for producing valuable sodium-based chemicals from a brine containing sodium carbonate and sodium bicarbonate, such as those containing from about 8% to about 20% total alkali obtained by contacting water with an underground trona formation by heating the brine at about 100° C. to about 140° C. to evaporate water, convert sodium bicarbonate to sodium carbonate and to drive off resulting carbon dioxide, reacting the brine with reduced sodium bicarbonate with an aqueous sodium hydroxide solution in amounts to convert essentially all of the remaining sodium bicarbonate in the brine to sodium carbonate, cooling to about 5° C. to about 25° C. to precipitate sodium carbonate decahydrate crystals, separating the crystals from their mother liquor, melting the separate crystals to form a sodium carbonate solution, heating the solution to from above about 60° C. to below 110° C. to evaporate water, precipitating sodium carbonate monohydrate crystals, separating the sodium carbonate monohydrate crystals from their mother liquor and calcining them to soda ash which is recovered as a product. The sodium hydroxide used in the above process is formed preferably by causticizing sodium carbonate values with calcium oxide or calcium hydroxide in a separate but parallel operating causticizing circuit.

35 Claims, 3 Drawing Sheets

PROCESS FOR PRODUCING SODIUM SALTS FROM BRINES OF SODIUM ORES

This invention relates to an improved process for recovering sodium chemicals, including sodium carbonate and/or sodium bicarbonate values from underground ore formations, especially trona, useful in manufacturing soda ash, sodium bicarbonate, caustic soda, sodium carbonate decahydrate, sodium carbonate monohydrate and other sodium chemicals, and especially to the recovery of these sodium chemicals from aqueous brine solutions obtained by dissolving such underground ore formations.

In southwestern Wyoming, in the vicinity of Green River, a vast deposit of crude, mineral trona ($Na_2CO_3 \cdot NaHCO_3 \cdot 2H_2O$) which lies some 800 to 3000 feet beneath the surface of the earth has been discovered. Other such underground deposits of trona have also been discovered in Turkey and China. The main trona bed at Green River is present as a seam about 12 feet in thickness at approximately the 1500 foot level analyzing about 90% trona. The Green River trona beds cover 1000 square miles and consist of several different beds which generally overlap each other and are separated by layers of shale. In some areas, the trona beds occur over a 400 foot stratum with ten or more layers comprising 25% of the total stratum. The quality of the trona varies greatly, of course, depending on its location in the stratum.

A typical analysis of this crude trona being mined at Green River, Wyoming, is as follows:

| Constituent | Percent |
| --- | --- |
| Sodium Sesquicarbonate | 90.00 |
| NaCl | 0.1 |
| $Na_2SO_4$ | 0.02 |
| Organic Matter | 0.3 |
| Insolubles | 9.58 |
| | 100.00 |

As seen in the above analysis, the main constituent of crude trona is sodium sesquicarbonate. The amount of impurities, primarily shale and other nonsoluble materials, is sufficiently large that this crude trona cannot be directly converted into products which can be utilized in many commercial processes. Therefore, the crude trona is normally purified to remove or reduce the impurities before its valuable sodium content can be sold commercially as: soda ash ($Na_2CO_3$), sodium bicarbonate ($NaHCO_3$), caustic soda ($NaOH$), sodium sesquicarbonate ($Na_2CO_3 \cdot NaHCO_3 \cdot 2H_2O$), a sodium phosphate ($Na_5P_3O_{10}$) or other sodium-containing chemicals.

One major use for the crude trona is to convert and refine it into soda ash. In order to convert the sodium sesquicarbonate content of the trona to soda ash in commercially feasible operations, two distinct types of processes are employed. These are the "Sesquicarbonate Process" and the "Monohydrate Process".

The "Sesquicarbonate Process" for purifying crude trona and producing a purified soda ash is by a series of steps involving: dissolving the crude mined trona in a cycling, hot mother liquor containing excess normal carbonate over bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out as the stable crystal phase, recycling the mother liquor to dissolve more crude trona and calcining the sesquicarbonate crystals at a temperature sufficient to convert same to soda ash.

A more direct and simplified method which was subsequently developed is the "Monohydrate Process" which yields a dense, organic-free soda ash by a series of steps involving: calcining the crude trona at a temperature of 400° C. to 800° C. to convert it to crude sodium carbonate and removing the organics by oxidation and distillation, dissolving the crude sodium carbonate in water, clarifying the resulting sodium carbonate solution to remove insolubles as muds therefrom, filtering the solution, evaporating water from the clarified and filtered sodium carbonate solution in an evaporator circuit, crystallizing from the pregnant mother liquor sodium carbonate monohydrate, calcining the monohydrate crystals to produce dense, organic-free soda ash and recycling the mother liquor from the crystals to the evaporating step.

The calcination of the crude trona in the above process has a threefold effect. First, by calcining between a temperature of about 400° C. to 800° C., the organic matter present in the crude trona is removed. Secondly, the calcination effects a conversion of the bicarbonate present in the crude trona to sodium carbonate. Lastly, the crude sodium carbonate resulting from the decarbonation has a greater rate of solubility than the crude trona. A comparison of the solubility rates is set forth in Table I.

TABLE I

| | Percent $Na_2CO_3$ in Solution | |
| --- | --- | --- |
| Time, Minutes | Crude Trona | Crude Sodium Carbonate |
| 1 | 13 | 31.5 |
| 2 | 17 | 32.5 |
| 3 | 18.5 | 32.5 |
| 5 | 19 | 32.0 |

The ore used in the "Sesquicarbonate Process" and "Monohydrate Process" is conventionally dry mined trona obtained by sinking shafts of 1500 feet or so and utilizing miners and machinery to dig out the ore. The underground mining techniques vary, including room and pillar mining, continuous mining, long wall mining, etc., and all have been employed to improve mining efficiency depending on the mine depth and ore variations. However, because of the depth of the mine and the need to have miners and machinery operating underground to dig and convey the ore to the surface, the cost of mining the ore is a significant part of the cost of producing the final product.

One mining technique which has been tested and developed to avoid the high cost of having miners and machinery underground is solution mining. In its simplest form, solution mining is carried out by contacting a sodium-containing ore such as trona with a solvent such as water to dissolve the ore and form a brine containing dissolved sodium values. The brine is then recovered and used as feed material to process it into one or more sodium salts. The difficulty with solution mining an ore such as trona is that it is an incongruently dissolving double salt that has a relatively slow dissolving rate and requires high temperatures to achieve maximum solubility and to yield highly concentrated solutions which are required for high efficiency in present processing plants. Further, solution mining may also yield over time brine solutions of varying strength, which must be accommodated by the processing plant. Also, the brine may be contaminated with chlorides, sulfates and the like, which are difficult to remove when processing the brines into sodium-containing chemicals.

In an effort to improve solution mining processes, it was first proposed in U.S. Pat. No. 2,388,009 issued to R. D. Pike on Oct. 30, 1945 that a hot mother liquor containing excess sodium carbonate be circulated underground to achieve a brine saturation at temperatures above 85° C. for use in sodium sesquicarbonate production. When tested, this system did not yield the saturated exit brine desired for commercial application despite inordinately high inlet temperatures and excessive heat losses.

Another proposal in U.S. Pat. No. 2,625,384 issued to R. D. Pike et al on Jan. 13, 1953 used water as a solvent under essentially ambient temperatures to extract trona underground in mined areas, but the dilute solution had to be enriched by heating and dissolving additional mechanically mined trona in it before being processed into soda ash. The process has never been found workable. Entering such mined areas which may no longer have roof bolts and in which subsidence of the area has commenced is too hazardous for normal practice.

Other patents involved in solution mining such as U.S. Pat. No. 3,119,655 issued to W. R. Frint et al on Jan. 28, 1964 and U.S. Pat. No. 3,050,290 issued to N. A. Caldwell et al continued to advocate use of high solvent temperatures to increase trona dissolution, with the '655 patent also teaching fortifying the recovered hot brine with a mother liquor containing sufficient sodium carbonate values to yield a solution from which sodium sesquicarbonate will precipitate.

In all of these prior art solution mining processes, the intent was to use either a heated aqueous solvent, or to fortify the recovered brine with added alkali values, to produce a highly concentrated solution which could be economically processed in the conventional Monohydrate Process or Sesquicarbonate Process, described above.

Another approach, not involving a heated aqueous solution as the solvent, was revealed in U.S. Pat. No. 3,184,287 issued to A. B. Gancy on May 18, 1965. This involved using sodium hydroxide (caustic soda) in the aqueous solvent to increase the dissolving rate and to reach a high solubility of trona values at low temperatures and to achieve congruent dissolving. This process uses a caustic soda solution in excess of 3% NaOH by weight to achieve brine solutions containing in excess of 19% sodium carbonate which can be processed into soda ash via the monohydrate process, i.e., evaporation to yield sodium carbonate monohydrate crystals. This process was placed into practice in 1984 and has resulted in exit well brine solutions containing up to 28% sodium carbonate, which can be readily processed economically into soda ash. However, this level of sodium carbonate concentration requires an inlet solvent containing about 8% caustic soda. This caustic soda solvent is expensive to manufacture in such quantities required for underground solution mining.

U.S. Pat. No. 3,953,073 issued to W. H. Kube on Apr. 27, 1976 pointed out that using less caustic in the solvent (1%–3%) resulted in more soda ash values in the outlet brine per ton of caustic soda required, if the brine were heated and saturated at elevated temperatures. However, the resulting brine contains a more dilute soda ash content than when using higher caustic soda concentrations, and much of the soda ash value (total alkali) in the solution is present as sodium bicarbonate which complicates the processing into soda ash. No attempt was made to explain how this semi-dilute sodium bicarbonate/carbonate mixture could be economically converted into soda ash.

U.S. Pat. No. 4,869,882 issued to Dome et al on Sep. 26, 1989 teaches treating waste waters from a soda ash plant containing 7%–14% "equivalent soda ash" to recover soda ash values by neutralizing any bicarbonate impurity with lime, clarifying the liquor, cooling the liquor to below 30° C. while evaporating water to yield a solution containing 17%–24% soda ash, crystallizing sodium carbonate decahydrate, and recovering the sodium carbonate decahydrate. However, all bicarbonate must be neutralized with lime in this process. No other means of bicarbonate destruction is taught. This is of little concern to Dome et al in their process because the waste waters from a commercial monohydrate plant contain bicarbonate in relatively small quantities as an impurity, and the waste stream is relatively small compared with the liquors handled in the main stream of the soda ash plant. Also, Dome et al require that the entire waste water stream be treated directly with lime, requiring treating vessels of sufficient size to lime the entire stream being treated by their process.

In terms of obtaining maximum dissolution of alkali values per change in degree centigrade of the aqueous solvent it is found that maximum increases in percent dissolution per degree takes place when the temperature increases from 0° C. to 30° C. Beyond 30° C., the total amount of alkali values dissolved does increase with temperature, but the percent of increased dissolution obtained per degree of heat added decreases substantially.

Unfortunately, the temperature range in which heat energy is most efficient in dissolving equivalent alkali values, say 0° C. to 30° C., yields saturated solutions that are still relatively dilute. For example, at 20° C., an aqueous solution in equilibrium with solid trona contains dissolved therein about 17% $Na_2CO_3$ and 4% $NaHCO_3$. At 30° C., the solution contains about 17.3% $Na_2CO_3$ and about 4.7% $NaHCO_3$. This shows that small differences in solvent temperatures will not significantly change the equilibrium composition and that the final composition is substantially more dilute than that obtained by using costly sodium hydroxide in the solvent, or by heating the solvent used to dissolve trona to high temperatures which is not in the interest of energy economy.

None of the previous patents or literature has revealed a process where the problem of dealing with incongruent dissolution, low dissolving rates, dilute brines and varying brine concentration can be overcome without economic disadvantages of high temperatures and/or costly additives to the solvent.

It has now been found that these problems can be overcome by a process for producing valuable sodium-based chemicals from a brine containing sodium carbonate and sodium bicarbonate, and preferably, having a total alkali value of at least 8%, which comprises heating the brine at temperatures of about 100° C. to about 140° C. to evaporate water, convert sodium bicarbonate to sodium carbonate and to drive off resulting carbon dioxide therefrom, reacting the resulting brine having a reduced sodium bicarbonate content with an aqueous sodium hydroxide solution in amounts to convert essentially all of the remaining sodium bicarbonate in the resulting brine to sodium carbonate, the aqueous sodium hydroxide solution preferably being formed by causticizing sodium carbonate values with calcium oxide or calcium hydroxide, cooling the sodium hydroxide-treated brine to a temperature of about 25° C. to about 5° C., precipitating sodium carbonate decahydrate crystals, separating sodium carbonate decahydrate crystals from their mother liquor, melting separated crystals of sodium carbonate decahydrate to form a sodium carbonate solution, heating the resulting sodium carbonate solution to a temperature of above about 60° C. to below about 110° C. to evaporate water, precipitating sodium carbonate monohydrate crystals, separating the sodium carbonate monohydrate crystals from their mother liquor, calcining separated crystals of sodium carbonate monohydrate to produce soda ash and recovering the soda ash.

Figure 1:
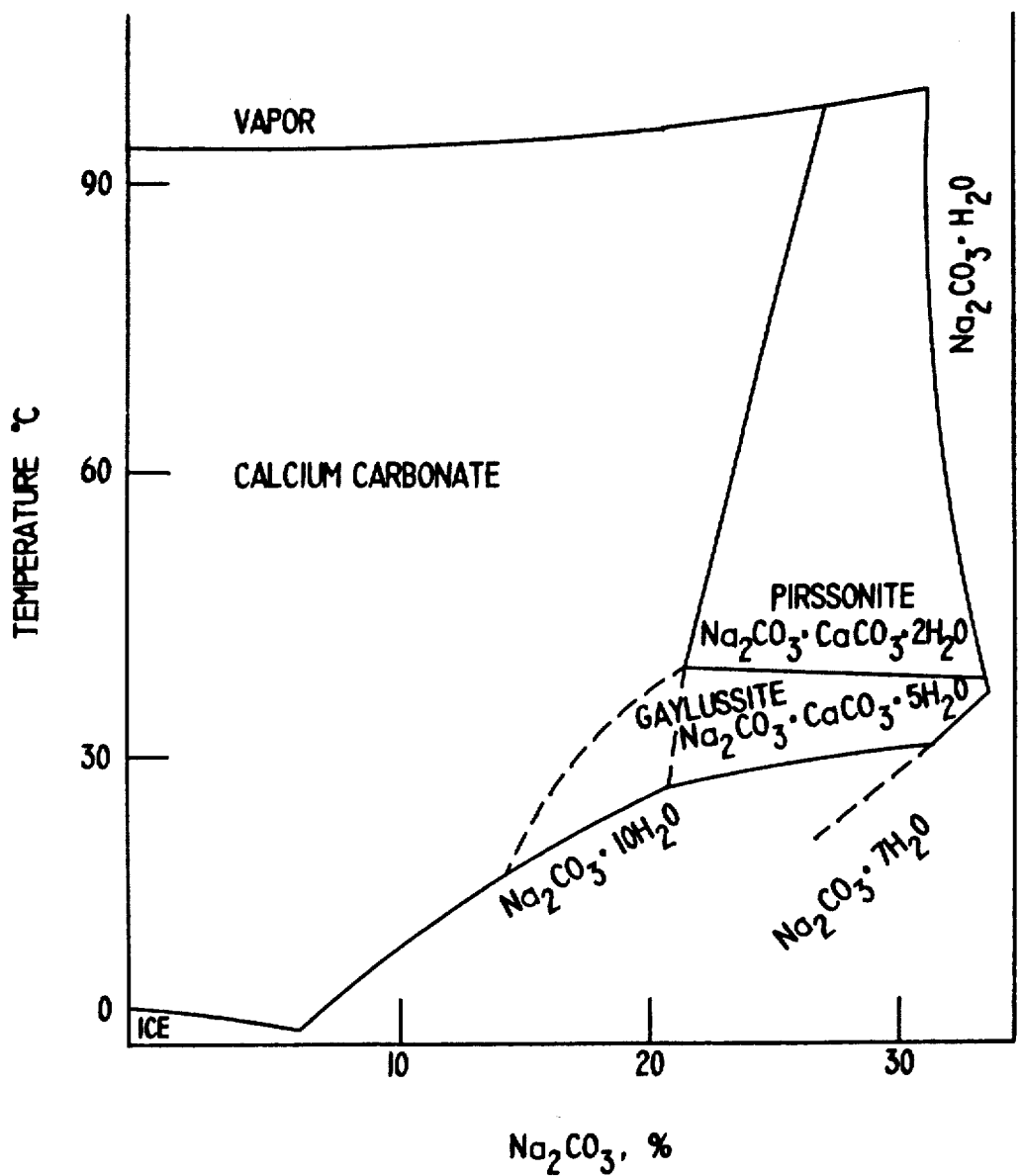
FIG. 1 is a graph of the phase relationship for the sodium ion-calcium ion-carbon dioxide-water system at various sodium carbonate concentrations and temperatures.

The term "TA" or "total alkali" as used herein refers to the weight percent in solution of sodium carbonate and/or sodium bicarbonate (which latter is conventionally expressed in terms of its equivalent sodium carbonate content). For example, a solution containing 17 weight percent $Na_2CO_3$ and 4 weight percent $NaHCO_3$ would have a TA of 19.5%.

The present process is most advantageous in being able to utilize dilute brines obtained by using low temperature water as the solvent for solution mining because these dilute brines can be readily handled by the instant process. The process also reduces the lime requirements for converting sodium bicarbonate to sodium carbonate in a brine as much as 50% compared with the requirements for such conversion in an untreated brine.

In addition, the process lends itself to handling brines which are nonuniform, such as those that vary in their sodium bicarbonate to sodium carbonate ratios that would be obtained when using low temperature water to solution mine trona because of its incongruent dissolution phenomena, as explained below. Further, the process enables one to utilize solution mined trona which has relatively large amounts of soluble impurities such as chlorides, sulfates, organics and silicates which can occur from in situ dissolving of certain ore deposits or from using as aqueous solvents, solutions which have been considered as waste streams because of the contaminants contained therein. The products obtained from the process include different sodium-containing salts and they are obtained in a relatively pure state with the bulk of the impurities remaining in waste streams of the process. This is in contrast to the prior art processes heretofore known which employed saturated solutions of sodium carbonate containing salts, or at least highly concentrated solutions of said salts, as feeds to the prior art processes in order to make these processes economically viable.

When trona ore is solution mined with water, the trona is incongruently dissolved. Therefore, when crude trona is dissolved in water, sodium sesquicarbonate (which constitutes 90% of the trona ore) cannot be crystallized from the solution by cooling.

Solution mining of trona at 20° C. with a water solvent results in dissolving the trona until the solution reaches saturation with respect to the bicarbonate at 20° C. At that point, continued contact of the vent with more trona results in sodium bicarbonate precipitating out and additional sodium carbonate dissolving until an equilibrium is reached with the trona at about 17% sodium carbonate and about 4% sodium bicarbonate. If the water solvent is about 30° C., the process is the same except that the final composition is only slightly more concentrated, at about 17.3% sodium carbonate and about 4.7% sodium bicarbonate. From this it will be seen that small increases in solvent temperature, at these temperature ranges, will not significantly change the equilibrium composition and, therefore, raising the temperature of the water solvent above the normal temperature of the trona formation which is normally about 20° C. to 22° C. (at about 1500 feet below the surface) is not in the interest of heat economy.

As the trona is incongruently dissolved in the water solvent and reaches equilibrium a layer of sodium bicarbonate will be formed on the surface of the trona face being dissolved. The sodium bicarbonate layer impedes the dissolution of the trona, but does not stop it, since sodium bicarbonate is also soluble in water. What complicates the solution mining process when using ground temperature water as the solvent is that the resulting exit brine changes in composition with time because more bicarbonate dissolving occurs and less trona goes into solution as time progresses. Ultimately, the brine will become gradually reduced in strength but the degree of this depends on the relative amounts of trona and water used. When large amounts of trona are present and the amount of water solvent is limited, so that the trona-water combination approaches equilibrium values, the resulting brine at equilibrium will continue to contain about 17% sodium carbonate and about 4% sodium bicarbonate. This occurs when the area being solution mined by the water solvent contains millions of tons of trona with lots of exposed surface area. In time, it would be expected that the exit brine would have difficulty in reaching an equilibrium with the trona. Then the exit brine composition will change with the bicarbonate concentration increasing and the carbonate concentration decreasing. Although this may not occur for many years, any process which uses the brine as a feed stock should be able to handle this change in feed liquor composition without major process or equipment changes. This is in fact what the present process does. The above concentrations of sodium carbonate and sodium bicarbonate at equilibrium are based upon pure solutions. If substantial amounts (over 1%) of sodium chloride and/or sodium sulfate or other salts are also present, this will reduce the amount of carbonates in solution at equilibrium.

In order to obtain brine for use as the feed solution in the present process, water or water solution containing small amounts of sodium carbonate and/or sodium bicarbonate are employed as the solvent for solution mining of the trona ore. For maximum solution mining of trona an ideal solvent is a water solution containing less than about 3% sodium carbonate and/or less than 3% sodium bicarbonate. The temperature of the solvent is preferably maintained at the temperature of the trona formation being solution mined which is at about 20° C. to 22° C. (at a depth of about 1500 feet below the surface), and which may vary from about 15° C. to about 22° C. at various depths of the trona formation. Actual experience has shown that solution mining at ground temperature using water or a dilute water solution will result in a brine with a composition of about 4% by weight sodium bicarbonate and about 13% to about 16% by weight sodium carbonate, the exact amounts varying and depending on other salts and impurities that may be dissolved in the solvent. A brine having this concentration range of sodium carbonate and sodium bicarbonate will occur when there is ample trona to dissolve and the solvent contacts the trona even though part or perhaps all of the trona has a layer of sodium bicarbonate formed on its surface. One of the easiest methods to assure that there is ample trona surface available for solution mining is to mechanically mine the trona and then contact the remaining trona with solvent to solution mine the remaining trona until it is covered with a layer of bicarbonate, at which point the solution composition will begin to change. An ideal brine useful in the present process is that obtained from the process described in U.S. Pat. No. 5,043,149 issued et al on Aug. 27, 1991. In this patented process, insoluble tailings from a soda ash plant are slurried with an aqueous medium and pumped down a well to an underground mined out cavity where the tailings are disposed of and the slurrying liquor used to dissolve remaining trona in the mined out area before the brine is pumped to the surface enriched in both sodium carbonate and sodium bicarbonate values. Most desirably, the brine is removed at the ground temperature of the trona bed at or near saturation with dissolved trona.

While the above represents the ideal brines useful in the present process, it should be understood that the brine feed to the present process may for example contain less sodium carbonate and more sodium bicarbonate, for example, about 9% by weight sodium carbonate and about 5% by weight sodium bicarbonate. In fact, the process is suitable for starting with any bicarbonate/carbonate brine, and preferably when the recovered brine solution has a total alkali value of at least about 8% to about 20% since handling brines which are more dilute than this become economically unattractive. For example, mine water which is water that has been in contact with trona formations and has dissolved trona, recovered from underground operations, can be employed as a brine feed, preferably when it contains at least 8% TA. As will be explained subsequently, the concentration of sodium carbonate and sodium bicarbonate in the brine and the ratio of the bicarbonate to carbonate salt is not critical since the present process is capable of handling such varied brines without any material changes in the processing steps or processing conditions.

In the first processing step, the feed brine is heated at temperatures of about 100° C. to about 140° C., and preferably at about 105° C. to about 125° C., to decompose some of the bicarbonate values to carbonate values, drive off the resulting carbon dioxide and to concentrate the sodium content of the brine. This can be carried out in a single stage or multiple stages where one or both functions of concentration and decomposition can be carried out in different stages. While this processing step can be carried out in many different types of equipment, mechanical vapor recompression units (MVR) are preferred. Because of their high efficiencies, MVR's are especially desired. They operate by compressing the overhead vapors of an evaporator by means of mechanically driven compressors and passing the compressed vapors through a heat exchanger where the heat is given up to the boiling brine solution passed through or over the heat exchanger.

Where multiple stages are employed, the bicarbonate values can be decomposed, without concentration of the feed liquor, in a stripping unit while an evaporator carries out the concentrating function along with additional bicarbonate decomposition. In this arrangement, the preheated feed brine is fed to a stripper where the brine is stripped by steam fed into the stripper from an evaporator. In the stripper, the brine at elevated temperatures is contacting by steam, resulting in some decomposition of the bicarbonate values in the brine and stripping of the evolved carbon dioxide. The partially stripped brine exiting from the stripper is fed into the evaporator where it is heated to concentrate the solution and generate steam which is then passed into the stripper. If desired, the steam from the evaporator may be compressed before being introduced into the stripper in order to supply additional heat values to the stripper. In the stripper, the preheated feed brine that is contacted with steam to decompose bicarbonate values remains at about the same brine concentration because water evolved from the stripper is essentially balanced by steam being fed into the stripper from the evaporator.

In the evaporator, the hot brine supplied by the stripper is boiled and this both concentrates the brine and further decomposes additional bicarbonate values not decomposed in the stripper. Carbon dioxide resulting from the decomposition is also stripped from the brine in the evaporator. This arrangement of a stripper and evaporator connected together is most preferred because it permits brine having lower amounts of bicarbonate values to be used in a causticizing step, discussed below, which further decrease the lime requirements of the process.

In the next step, the concentrated brine from the evaporator is treated with a dilute aqueous sodium hydroxide solution in amounts sufficient to neutralize essentially all of the bicarbonate values remaining in the brine. The resulting neutralized brine, which is essentially a concentrated sodium carbonate solution having a total alkali value greater than the feed brine, is then used as the feed to a sodium carbonate decahydrate crystallizer for recovery of sodium carbonate decahydrate crystals.

Figure 3:
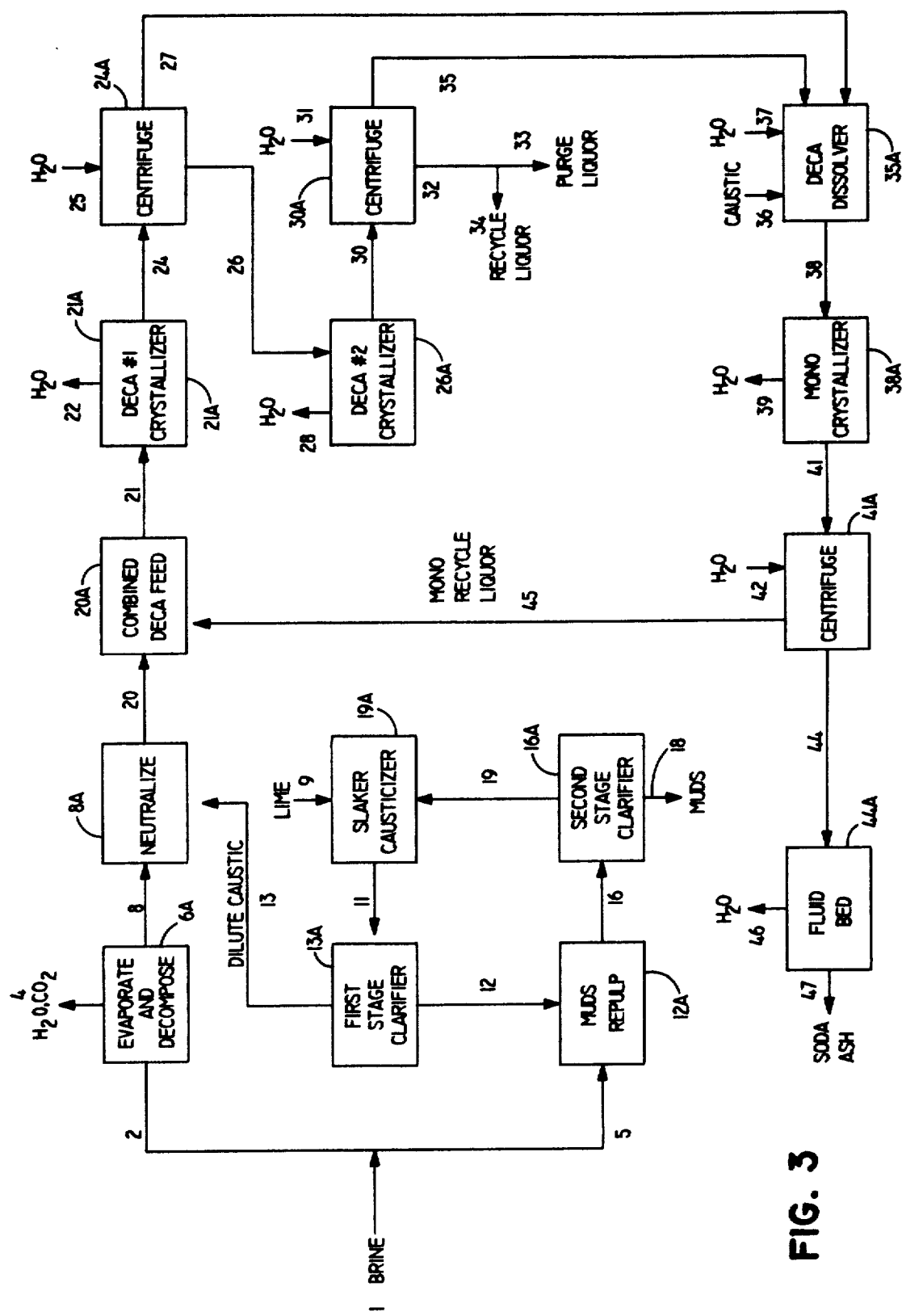
FIG. 3 is a block diagram in a schematic form of an alternate mode of carrying out the instant process in which the brine solution is divided into two branches, one branch going to the evaporating, crystallization and product recovery line while the other branch goes to a separate but parallel causticizing unit.

The dilute aqueous sodium hydroxide solution may be supplied from any source, but preferably is obtained by causticizing sodium carbonate and/or sodium bicarbonate values with lime, that is, calcium oxide, calcium hydroxide or equivalent CaO-containing salts. Preferably, this is carried out in a separate but parallel operation to the processing of the feed brine. This can be done by feeding a portion of the brine feed, for example, 15 weight percent 5 weight percent of the brine feed, to a causticizing operation simultaneously with the main brine feed being fed to the evaporator step. This splitting of the brine feed so that the major portion goes to the evaporator and a small portion is simultaneous fed in parallel to a causticizing circuit is illustrated in FIG. 3.

When a stripper and evaporator are employed together as reviewed above, a most preferred source of feed to a causticizing unit is the stripped brine solution that has had some of its bicarbonate values decomposed but which remains at about the same TA concentrations as the brine fed to the stripper. This stripped brine is a preferred feed to a causticizing unit because it requires less lime to causticize it than the original brine feed containing more bicarbonate values.

The reactions taking place in the causticizing unit are as follows:

I) $CaO + 2NaHCO_3 \rightarrow CaCO_3 + Na_2CO_3 + H_2O$
II) $CaO + Na_2CO_3 + H_2O \rightarrow CaCO_3 + 2NaOH$ As is clear from reaction II above, one mole of lime (CaO) will react with each mole of sodium carbonate in the brine stream fed to the causticizing unit to produce two moles of sodium hydroxide. However, since sodium bicarbonate also requires lime to convert it into sodium carbonate, as shown in reaction I) above before it can be reacted to form sodium hydroxide via reaction II, lower bicarbonate concentrations in the brine fed to the causticization unit means less lime usage in converting the total alkali into sodium hydroxide. Since the stripped brine from the stripper contains lower bicarbonate values than the brine feed, it becomes the preferred causticizer feed because it requires less lime to convert it into sodium hydroxide than the original brine feed.

In this process, the causticization reaction preferably is carried out simultaneously but in a parallel step to the evaporation and stripping of the brine feed. Only a sodium hydroxide solution is used in this process for neutralization of the evaporated feed brine. Any attempt at neutralization by adding lime directly to the evaporated and stripped feed brine, will result in the formation of a pirssonite precipitate which will form as a scale on the inside surface of any piping and eventually clog such piping. This is because the TA concentration of such evaporated brine feeds normally reach above 20 weight percent, and as shown in FIG. 1, at such concentrations such hot solutions will precipitate pirssonite if lime is present. By contrast, the use of only feed brine or stripped brine, which latter is at the same concentrations as the feed brine, and which is not above 20% by weight TA, as the feed to be causticized obviates this problem.

The causticization circuit introduces the stripped brine or brine feed to a muds repulping unit, which receives settled muds from a first stage clarifier. In the repulping unit, the muds, which may contain excess sodium hydroxide values from the causticization reaction, are mixed with stripped brine or brine feed and substantially dilute it. Any residual hydroxide values in the muds will react with any bicarbonate values in such brines, and avoid loss of such hydroxide values in the muds. The repulped mud and diluted brine feed then is fed to a second stage clarifier with added wash water to settle the muds from the dilute brine solution. The muds from the second stage clarifier are separated and either disposed of or calcined and recycled as CaO, while the diluted brine solution is passed to a slaker-causticizer and reacted with lime. It is important for optimum lime utilization that these reactions, previously shown in reactions I and II, be carried with dilute solutions of TA, that is, not above about 15% TA. This is to avoid obtaining $CaCO_3$ coatings around the lime particles which blocks the remainder of the lime within the $CaCO_3$-coated particle from reacting completely. This will occur if undiluted brine solution, for example, at a TA of about 18%, is brought into direct contact with lime in the slaker-causticizer.

The slurry formed in the slaker-causticizer then is passed to a first stage clarifier to separate the muds from the solution of sodium hydroxide. The clarified sodium hydroxide solution is separated and sent to the neutralizer step, while the settled muds are sent to the muds repulper stage for mixing with more brine feed to repeat the cycle of causticization. This four-step cyclic circuit assures proper lime utilization during causticization and avoids substantial loss of any hydroxide values in the muds separated from the clarified hydroxide solution.

The entire four-step cyclic causticization circuit is carried out at elevated temperatures of 70° C. to 100° C. This allows better utilization of lime since the causticization reaction is more efficiently carried out at such elevated temperatures and promotes better settling of the muds. Additionally, the reaction is exothermic and facilitates maintaining the solutions at elevated temperatures. The final aqueous caustic solution is also recovered hot and is a dilute solution of sodium hydroxide having a concentration of about 6 to about 12 weight percent NaOH, with about 8% by weight NaOH being typical.

In carrying out the next stage of the process, which is the neutralization stage, concentrated and partially decarbonated brine which has reached a total alkali level of from about 24% to about 30% TA is passed into the neutralizer step along with sufficient amounts of hot dilute caustic generated in the causticizing circuit. The concentrated brine stream entering the neutralization stage is contacted with sufficient amounts of the aqueous caustic solution from the causticizing circuit to convert essentially all of the bicarbonate values to carbonate. The term "neutralization" or "neutralization stage" means the conversion of sodium bicarbonate to sodium carbonate by reaction with sodium hydroxide.

It is desired that the amount of caustic solution added be sufficient to neutralize essentially all the bicarbonate values and convert them to sodium carbonate values since the presence of bicarbonate values is undesired in the next stage of the process. Small amounts of bicarbonate on the order of less than half a percent by weight are permissible. The addition of the dilute caustic to the concentrated brine stream also dilutes the brine stream because of substantial water added to the stream in addition to the sodium hydroxide.

The resulting stream issuing from the neutralizer step has a concentration of about 20% to 30% total alkali with about 25% TA being typical. The stream issuing from the neutralizer which is at a temperature of about 90° C. to about 10° C. is preferably filtered and heat exchanged with cool brine to a temperature of about 70° C. to about 90° C. and introduced into a sodium carbonate decahydrate crystallizer. In this crystallizer, sodium carbonate decahydrate crystals are formed and separated from the liquor by evaporative cooling and by the removal of water during the evaporative step. In practice, two sodium carbonate decahydrate crystallizers are employed in series in order to balance the amount of slurry recovered from each crystallizer and thereby avoid increasing the percent solids in the slurry that is recovered from any one crystallizer. The first crystallizer is operated at a temperature of about 15° C. to about 25° C. in order to crystallize the first crop of crystals. The slurry removed from the crystallizer is then sent to a first centrifuge where the slurry is washed to remove impurities remaining on the surface of the decahydrate crystals. The washings and mother liquor from the first centrifuge are then passed into a second sodium carbonate decahydrate crystallizer operated at a lower temperature than the first crystallizer. Again, by evaporative cooling of the second crystallizer to temperatures of about 5° C. to about 15° C., a second crop of sodium carbonate decahydrate crystals is recovered. The crystal slurry from this crystallizer goes to a second centrifuge where they are washed and all or a part of the mother liquor and washings are purged.

The sodium carbonate decahydrate crystals so recovered can be melted by adding a small amount of water and heating above 30° C. to yield a pure solution of about 30% by weight sodium carbonate. The crystals or solution in turn can be used as a raw material for producing sodium-containing chemicals such as sodium phosphates or most notably for the making of caustic soda by a chemical reaction with lime. Alternately, the solution formed by melting the crystals can be carbonated to form sodium bicarbonate or sodium sesquicarbonate crystals which can be separated and recovered as a product.

If solid soda ash is the desired product, the 30% sodium carbonate solution is further evaporated at temperatures above about 60° C. but below about 110° C. to form sodium carbonate monohydrate crystals or at temperatures above 110° C. to form anhydrous sodium carbonate crystals. If any objectionable amounts of sodium bicarbonate values remain in the sodium carbonate monohydrate evaporator feed, they can easily be converted to sodium carbonate with small amounts of dilute caustic soda. The monohydrate crystals are normally dried to form a dense soda ash. Sodium carbonate decahydrate crystals can also be used to produce a special grade of low density soda ash by gently drying the crystals, without melting, at low temperature but it is more difficult than the monohydrate route which is more popular in industrial practice.

Typically, the 30% sodium carbonate solution obtained by melting the sodium decahydrate crystals is sent to a monohydrate evaporator/crystallizer where the solution is heated to a temperature of about 100° C. by suitable multiple-effect evaporators or more preferably by a vapor recompression evaporator which allows evaporation of the solution and crystallization of the sodium carbonate monohydrate. The monohydrate crystal slurry is removed from the monohydrate evaporator crystallizer and sent to a centrifuge where the crystals are separated from their mother liquor. The mother liquor is returned to the monohydrate evaporator crystallizer while the crystals are sent to a dryer, such as a fluid bed dryer, and heated at temperatures of about 115° C. to about 160° C. until converted into soda ash. Some of the mother liquor being returned from the centrifuge to the monohydrate evaporator crystallizer may be subject to purge to control impurity levels, or preferably this monohydrate mother liquor purge is recycled to the sodium carbonate decahydrate crystallizer by mixing it with neutralized, concentrated brine and feeding the mixture to the sodium decahydrate crystallizer. This permits recovery of the sodium carbonate values in the monohydrate mother liquor purge stream as decahydrate crystals and since the purge stream of mother liquor from the sodium decahydrate crystallizer is more concentrated in impurities less sodium carbonate values are purged.

The 30% sodium carbonate solution produced by melting the decahydrate crystals is relatively pure and free of impurities and when used to produce soda ash via the sodium carbonate monohydrate route will yield a final soda ash quality which is comparable to soda ash produced via the conventional monohydrate process. However, if an exceedingly high purity soda ash is desired, the monohydrate crystallizer mother liquor can be purged at a high rate from the stream returning mother liquor from the centrifuge to the evaporator. This keeps impurities in the mother liquor very low and this purge can be sent to the decahydrate crystallization step so that no additional alkali is lost from the system.

Referring now to the drawings, FIG. 1 is a graph of the phase relationship for the sodium ion-calcium ion-carbon dioxide-water system in which the horizontal axis of the graph is percent sodium carbonate and the vertical axis is temperature 0° C. in the system.

As will be readily observed, once the sodium carbonate concentration reaches above 20% and temperatures of about 40° C. and above are reached, pirssonite ($Na_2CO_3 \cdot CaCO_3 \cdot 2H_2O$) will precipitate from the solution since this is the stable phase at these temperatures and sodium carbonate concentrations. Pirssonite is a solid which precipitates in equipment as a scale and tenaciously adheres to the inside of any pipes or reactors it contacts. If pirssonite is permitted to precipitate without being prevented, it will scale up piping to a point where it will essentially close up and block pipelines carrying this material. Operation of the clarifiers would also be much more difficult. Additionally, since pirrsonite is a double salt containing sodium carbonate, its precipitation represents significant losses of TA and a lowering of process efficiency. For every ton of calcium carbonate over one tone of sodium carbonate is lost. Furthermore, formation of pirrsonite prevents the recycling of lime via calcination of the calcium carbonate muds in a lime kiln. The high sodium content will act as a flux and lead to the formation of rings inside the lime kiln, as well as alkali attack of the liners. This yields significantly higher maintenance, lower onstream time, and increased operating costs. It is for these reasons that lime cannot be added to the concentrated brine feed which is at concentrations above 20% TA to convert the sodium bicarbonate values in the brine to sodium carbonate. Instead, in applicants' process a portion of the original brine stream, preferably stripped of some of its carbon dioxide, is causticized with lime to form sodium hydroxide and only this sodium hydroxide is used to neutralize the concentrated and partially decomposed brine to avoid pirssonite formation.

Figure 2:
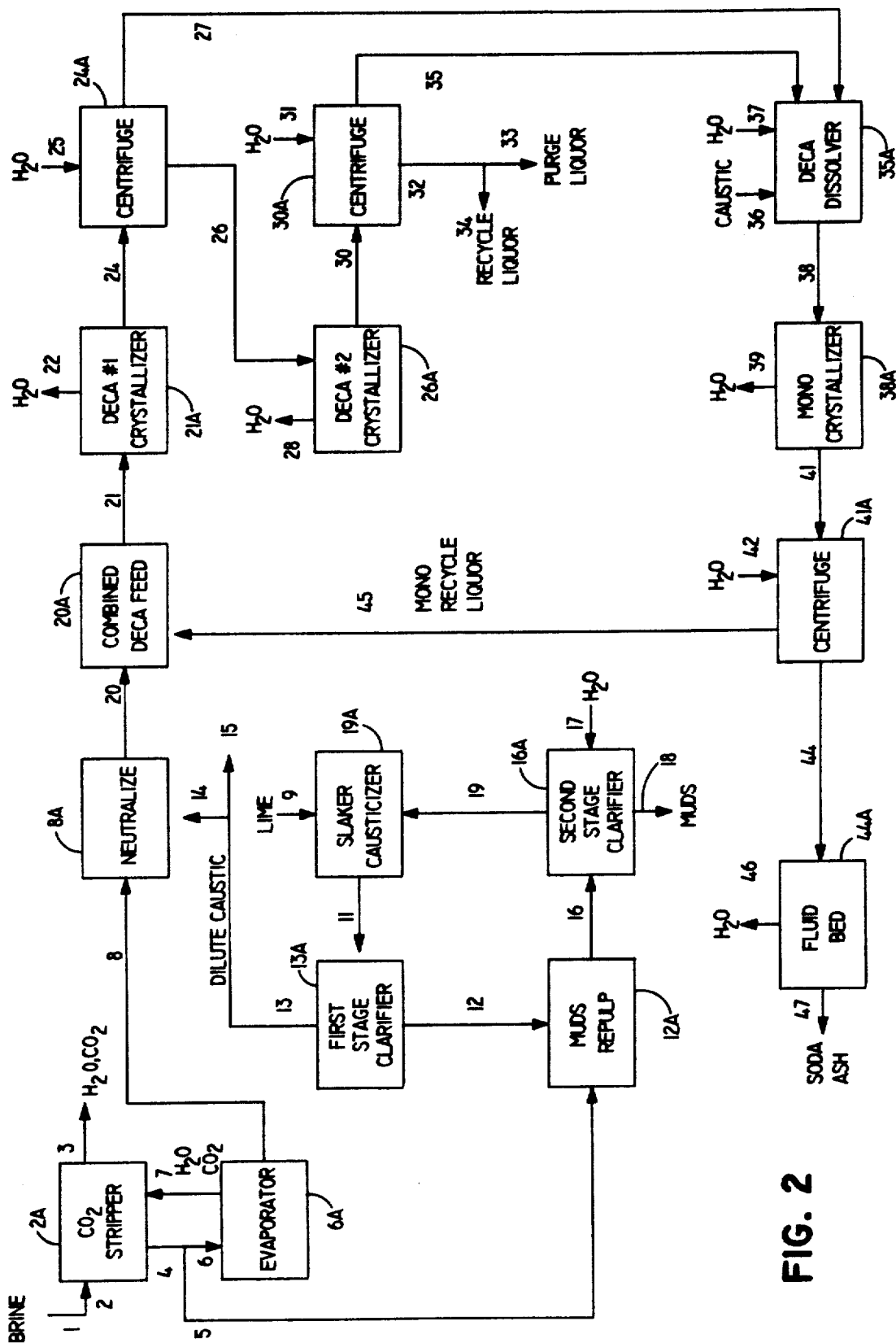
FIG. 2 is a block diagram in a schematic form for carrying out the instant process in its preferred form.

FIG. 2 is a block diagram in schematic form which represents the preferred mode of carrying out the present process. This will be discussed in detail below.

FIG. 3 is also a block diagram in schematic form for carrying out the instant process which differs from the process shown in FIG. 2 only in the way the brine feed is handled. In FIG. 3, the brine feed is split with the major portion, about 85% by weight, being fed to the evaporator, with the remaining 15% being fed to the separate but parallel causticizer circuit. In this embodiment, only an evaporator is used to decompose a portion of the bicarbonate values in the brine and concentrate it. The remainder of the brine feed is passed into the muds repulper portion of the causticizing circuit where the sodium carbonate values in the brine are causticized to form sodium hydroxide and the resulting sodium hydroxide solution is used to neutralize the concentrated brine from the evaporator.

This is in contrast to the process illustrated in FIG. 2 in which both an evaporator and stripper are employed and in which the feed to the causticizing circuit is a portion of the stripped solution from the stripper. The feed scheme shown in FIG. 2 is preferred because less bicarbonate values are present in the stripped brine fed to the causticizer circuit than ordinary feed brine used in FIG. 3 and therefore, it utilizes less lime than the scheme shown in FIG. 3.

Referring to FIG. 2, the brine feed 1 is passed via line 2 into a carbon dioxide stripper 2A. The brine is preferably obtained by solution mining of trona formations at the temperature of the trona formation which is normally about 20° C. to about 22° C. (at a depth of about 1500 feet below the surface). Of course, brine which has been solution mined at higher temperatures can also be used, but it is not an efficient use of heat. Brine which has been formed by dissolving trona at the temperature of the trona formation normally has a composition of about 4% to about 5% by weight sodium bicarbonate and about 13% to about 16% by weight sodium carbonate, with a typical feed having a concentration of about 4.5% sodium bicarbonate and 14% sodium carbonate. A brine having a total alkali of above 8% to about 20% is preferred. An excellent brine feed is mine water which has been in contact with sufficient quantities of trona to yield a TA of at least 8%, which is recovered from underground operations, and which is often saturated with trona at the temperature of the trona formation.

The brine feed introduced through line 2 into stripper 2A is typically preheated by passing it through a heat exchanger (not shown) before it enters the stripper. The feed brine may also be filtered to remove any insoluble material present from the solution mining step before it is introduced into the stripper 2A. It is also possible to carry out a filtration step on the neutralized solution described hereinafter. The brine in stripper 2A is contacted with steam that is introduced through line 7 from evaporator 6A. The brine in stripper 2A is maintained at a temperature of about 100° C. to about 140° C. and preferably at a temperature of about 105° C. to about 125° C. in order to decompose a portion of the sodium bicarbonate values in the brine. The carbon dioxide produced by decomposition of the bicarbonate values in the brine are removed from stripper 2A through line 3 along with some water vapor. However, since the water vapor being removed through line 3 and being introduced through line 7 are approximately equal the brine solution in the stripper 2A undergoes very little change in concentration of TA. The stripper may be any column, either packed or of other design, to permit contact of the steam and brine solution counter-currently. The recovered brine solution from stripper 2A, which has not changed much in TA concentration, but which has had its bicarbonate values reduced is removed through line 4.

At this point, the stripped brine is split into two streams. One stream, which represents from about 10% to about 20% by weight of the solution is passed via line 5 into the causticizing step which operates in parallel with the remainder of the process. Stream 5 enters the muds repulping stage 12A, which is the feed entry point into the causticization circuit. The remainder of stream 4, which constitutes from about 80% to 90% of stream 4, enters via line 6 into evaporator 6A which is operated at a temperature of about 100° C. to about 140° C. In evaporator 6A, the stripped brine solution is evaporated to concentrate the solution and the heat in the evaporator also results in decomposition of additional sodium bicarbonate values present in the brine. The evaporated water and carbon dioxide evolved from decomposition of bicarbonate values is sent via line 7 into stripper 2A. The evaporator 6A can be of any commercial type including falling film and forced circulation types employing either MVR unit or multiple effect as desired. Additionally, if desired, steam from the evaporator 6A can be compressed before being introduced in the stripper 2A in order to supply additional heat values to the stripper. The thus concentrated brine containing reduced amounts of sodium bicarbonate values is then passed via line 8 into neutralizer 8A.

A filtration step may be required to remove any insoluble material present in the feed brine resulting from the solution mining step. This filtration can be done on the feed brine before it is introduced into the stripper or it can be carried out on the evaporated solution obtained after the evaporation step has been completed. When possible, filtration of the evaporated brine is more desirable because important impurities associated with trona are organic materials such as mono- and dicarboxylic acids which are soluble in these alkaline solutions. If these organic constitutents exceed a certain level in the feed solution, which also has been found to be the case, then evaporation and concentration of the solution results in the organics exceeding their solubility limits and some are precipitated. By filtering the concentrated solution after evaporation, rather than the feed brine, such filtration removes the precipitated organic impurities in the solution as well as any insolubles present in the feed brine in one filtration operation. This is especially true when the feed brine has less than 0.5 weight percent insolubles present since the small amounts of insolubles can be handled readily in small filtration units. Larger amounts of insolubles might require an initial brine feed filtering to remove large quantities of insolubles.

An especially desirable point to carry out filtration on the evaporated solution is after the neutralization step, discussed above. Such filtration removes not only the insolubles in the brine feed but also any insolubles brought into the systems from other streams such as caustic soda introduced from a causticizing circuit.

The evaporated brine in line 8 may also require treatment to remove organic impurities, depending on the type and amount of such organic compounds. When required, it is most conveniently carried out by passing the brine through a bed of adsorbent material such as activated carbon, charcoal, or equivalent adsorbents, and selectively adsorbing the organics while permitting the brine passing through the bed to be recovered with a reduced organics level.

In neutralizer 8A, stream 8 from evaporator 6A, having a temperature of about 100° C. to about 140° C., is treated with a dilute caustic solution on the order of 6 to 12 weight percent NaOH from line 14 in amounts sufficient to convert essentially all of the sodium bicarbonate values remaining in the brine to sodium carbonate values. Liquor 20 from the neutralizer step can be heat exchanged with cooler process streams. The amount of sodium hydroxide required for this neutralization is materially reduced in the present process because the combination of a stripper 2A and evaporator 6A converts from about 40% to about 50% of the sodium bicarbonate values present in the brine feed to sodium carbonate. This preliminary reduction in the amount of sodium bicarbonate values in the brine feed means that less sodium hydroxide solution is required to react with and neutralize the stripped and evaporated brine feed. The neutralized solution from neutralizer 8A, which is essentially an aqueous sodium carbonate solution, is removed via line 20 and passed into a combined feed tank 20A where it is mixed with recycle sodium carbonate monohydrate mother liquor from line 45. The combined sodium carbonate solutions in tank 20A are then removed and fed via line 21 to sodium carbonate decahydrate crystallizer 21A.

Returning now to the operation of the separate but parallel operated causticizing circuit, the stripped brine solution from line 5 is passed into the muds repulping unit 12A. This is simply a large tank with a mixer which permits the incoming solution in line 5, which normally has less bicarbonate than feed brine 2 to be mixed with muds entering through line 12 from a first stage clarifier 13A. This repulping step in repulper 12A is carried out at temperatures from about 70° C. to about 100° C. In the repulping unit 12A, the muds, which contain retained sodium hydroxide values from the causticization reaction, are mixed with the stripped brine to substantially dilute it and to recover any sodium hydroxide values in the muds. Any such remaining sodium hydroxide values in the muds will immediately react with sodium bicarbonate values introduced through line 5 to form sodium carbonate. The mixture of repulped mud and diluted brine is then fed via line 16 to a second stage clarifier 16A operated at a temperature of about 70° C. to about 100° C. to settle the muds from the dilute brine solution. The waste muds are purged through line 18 essentially free of sodium hydroxide values. Water required for dilution is introduced through line 17 into the second stage clarifier 16A.

The clarified solution from second stage clarifier 16A is removed via line 19 and passed into a slaker-causticizer 19A where lime is added through line 9 and mixed with the solution from line 19. The solution in line 19 introduced into the slaker-causticizer normally has a concentration of about 8% to about 14% of sodium carbonate with very little sodium bicarbonate or sodium hydroxide. The slaker-causticizer 19A is operated very hot because of the increased lime efficiency when causticizing at high temperatures. Normally, temperatures of about 80° C. to about 100° C. are employed.

It is important that the slaking operation be carried out with a solution containing no more than 20% by weight TA to avoid the possibility of precipitating pirssonite. This is easily regulated by controlling the concentration of the brine solution entering the causticization circuit and by using sufficient water in the repulper 12A and in the second stage clarifier 16A to dilute the stream in line 19 to suitable concentrations. Another reason for diluting the brine solution being fed to the causticizer is to obtain high efficiency of the lime reaction with the brine solution. When solutions are used having concentrations not above about 15% TA, it avoids forming calcium carbonate coatings surrounding the lime particles which block the lime within the calcium carbonate-coated particle from reacting completely with the carbonate and bicarbonate values present in the brine solution.

The slurry formed in slaker-causticizer 19A is then passed via line 11 into the first stage clarifier 13A to separate the muds from the sodium hydroxide solution.

The clarified sodium hydroxide solution is removed from clarifier 13A via line 13 as a dilute sodium hydroxide solution having a concentration of about 6% to about 12% by weight with about 8% by weight sodium hydroxide solution being typical. The dilute sodium hydroxide solution from line 13 is then passed into the neutralizer 8A through line 14. Any excess sodium hydroxide solution is removed through line 15 for storage or for concentration to produce a commercial product. The muds separated in clarifier 13A are removed and sent via line 12 to the muds repulping stage 12A for mixing with incoming stripped brine feed from line 5.

The entire four-step cyclic causticization system is carried out at elevated temperatures of about 70° C. to about 100° C. These elevated temperatures allow better utilization of lime since the causticization reaction is more efficiently carried out at elevated temperatures. Additionally, the causticization reaction is exothermic and it facilitates maintaining the solutions at elevated temperatures.

The neutralized brine stream from line 20 which is combined with recycled mother liquor from the sodium carbonate monohydrate crystallizer from line 45, discussed below, is removed from the combined feed tank 20A through line 21 at a temperature of from about 90° C. to about 110° C. It is then cooled by heat exchange means not shown to a temperature of about 70° C. to about 90° C. and introduced into the first of two sodium carbonate decahydrate crystallizers identified as 21A. The stream from line 21 entering crystallizer 21A normally has a sodium carbonate concentration of about 20% to about 30% with only trace amounts, not above about ¼% of sodium bicarbonate. In crystallizer 21A, sodium carbonate decahydrate crystals are formed by evaporative cooling of the solution and water vapor is removed via line 22. Evaporative cooling is preferred because it both concentrates the liquor in the crystallizer and this evaporation also cools the solution to crystallize sodium carbonate decahydrate. The crystal slurry formed in crystallizer 21A is then passed via line 24 into an initial centrifuge 24A to separate the decahydrate crystals from their mother liquor. The mother liquor is separated from the decahydrate crystals in centrifuge 24A and sent via line 26 to a second decahydrate crystallizer 26A. The crystals in centrifuge 24A are washed with water which enters through line 25. This is desired to get good separation of impurities from the crystals by washing the sodium carbonate decahydrate crystals to remove the impurities contained in the residual mother liquor remaining on the crystals. This assures obtaining crystals of higher purity.

In the second crystallizer 26A, the mother liquor from line 26 is further cooled to a lower temperature than in crystallizer 21A to crystallize a further crop of sodium carbonate decahydrate crystals. Crystallizer 26A is normally operated at temperatures of from about 5° C. to about 15° C. to obtain this second crop of crystals. This crystallizer like 21A is operated by evaporative crystallization and the water vapor is removed via line 28. The slurry removed from crystallizer 26A is then passed via line 30 into a second centrifuge 30A where the mother liquor is separated from the sodium carbonate decahydrate crystals and the mother liquor removed via line 32. In a continuous process, where further processing of decahydrate mother liquor is desired, all or a portion of the liquor would be discarded as purge to control impurity levels while any remainder could be recycled via line 34, for example, to the causticization circuit. Alternately, if the total alkali values are too low the remaining portion of the mother liquor from line 34 may be recycled as solution mining inlet solvent to increase its TA value. Another approach is to carbonate the decahydrate mother liquor and on cooling, recover sodium bicarbonate or sodium sesquicarbonate crystals and discard the mother liquor.

The sodium decahydrate crystals recovered from centrifuge 24A through line 27 and the decahydrate crystals recovered from the second centrifuge 30A recovered through line 35 are both fed into decahydrate dissolver 35A. In dissolver 35A, the sodium carbonate decahydrate crystals are melted by adding a small amount of water and heating above 30° C. to yield a pure solution of about 28% to about 31% by weight sodium carbonate. If desired, some of the sodium carbonate decahydrate crystals per se or the solution in deca dissolver 35A can be used as a raw material for producing sodium-containing chemicals such as sodium phosphates or most notably for the making of caustic soda by chemical reaction with lime.

When the desired end product is soda ash, the sodium carbonate solution in dissolver 35A may be treated with small amounts of caustic soda via line 36, when required, to eliminate residual amounts of sodium bicarbonate, if any, which are objectionable, during the subsequent sodium carbonate monohydrate crystallization stage. The highly concentrated sodium carbonate solution from the deca dissolver 35A is removed through line 38 and sent to a monohydrate evaporator/crystallizer 38A where the solution is heated to a temperature of above about 60° C. to below about 110° C. by suitable multiple-effective evaporators or more preferably by a vapor recompression evaporator to allow evaporation of the solution and crystallization of the sodium carbonate monohydrate. The monohydrate crystal slurry is removed from the monohydrate evaporator/crystallizer 36A via line 41 and sent to centrifuge 41A where the crystals are separated from their mother liquor. The crystals are washed with water which enters via line 42 and the washed crystals are removed via line 44 and sent to a dryer, preferably a fluid bed 44A. The crystals are heated in fluid bed 44A which is maintained at a temperature of about 115° C. to about 160° C. to dehydrate the sodium carbonate monohydrate and produce soda ash which is removed through line 47 as the product. Water evaporated in the fluid bed 44A is removed through line 46. Some of the mother liquor from centrifuge 41A is returned (by means not illustrated) to the monohydrate evaporator/crystallizer 38A. A portion of this recycled mother liquor may be subject to purge to control impurity levels. Preferably, this monohydrate mother liquor is recycled via line 45 to the sodium carbonate decahydrate crystallizer combined feed tank 20A and mixed with neutralized brine from line 20 and the mixture used as the feed to the sodium carbonate decahydrate crystallizer 21A. This permits recovery of the sodium carbonate values in the monohydrate mother liquor purge stream as decahydrate crystals. Also since the purge stream 33 of mother liquor from the decahydrate crystallizer 30A is more concentrated in impurities than the monohydrate mother liquor less sodium carbonate values are purged.

The concentrated sodium carbonate solution produced by melting the decahydrate crystals in dissolver 35A is relatively pure and free of impurities and when used to produce soda ash via the sodium carbonate monohydrate route shown in FIG. 2 will yield a final soda ash quality which is comparable to the soda ash produced via the conventional monohydrate process. However, if an extremely high purity soda ash is desired, the monohydrate crystallizer mother liquor can be purged at a high rate from the stream (not shown) returning mother liquor from the centrifuge 41A to the crystallizer/evaporator 38A. This keeps impurities in the mother liquor very low and this purge stream in turn can be sent via line 45 to the decahydrate crystallization step via the combined feed tank 20A so that no additional alkali values are lost from the system. The impurities in the monohydrate recycle liquor from line 45 are eventually purged via line 33 where they concentrate in the mother liquor of the decahydrate crystallizers and are separated in centrifuge 30A for purging via line 33.

The mother liquor separated from the decahydrate crystals in centrifuge 30A and removed via line 33 normally can be sent to waste as purge. However, for optimum conservation of residual alkali values in this stream and for recovery of the water in this stream, a portion of this mother liquor can be recycled via line 34 (not shown) to the causticizer circuit preferably to clarifier 16A, while the remainder will be discarded to assure a purge for the impurities in the stream and prevent impurity levels from rising in the system. This stream can also be carbonated to recover residual alkali values as sodium bicarbonate or sodium sesquicarbonate crystals. Alternately, the purge liquor from line 33 can be used as part of the solvent employed in solution mining of trona thereby increasing its total alkali value and facilitating the providing of the brine feed to the instant process. Whether a portion of the mother liquor must be purged before the remainder is used for solution mining will depend on the impurity levels in the mother liquor. In general, the impurities of the feed brine concentrate in the mother liquor from crystallizer 30A and some provision for the removal of these wastes must be made.

The present process has major advantages over those presently used in the art. Among these advantages are the following:

a. The instant process has lime requirements which are reduced by at least about 40% to as much as 50% treated to neutralize all of the sodium bicarbonate values without preliminary evaporation and/or stripping stages. This is a substantial reduction in an essential starting chemical and makes the process very economical to run.

b. The instant process can utilize as feed solution mined trona, where the in situ mining has been carried out using ambient temperature water as the solvent notwithstanding the fact these solutions do not contain the high concentrations of total alkali normally required and employed in conventional processes such as the monohydrate process. A low temperature aqueous solvent is of course most desirable because it minimizes energy requirements for solution mining.

c. The alkali values from the solution mined trona can be converted into a variety of products namely sodium carbonate decahydrate crystals, a pure 30% by weight sodium carbonate solution, sodium carbonate monohydrate crystals, sodium carbonate anhydrous crystals, sodium bicarbonate, sodium sesquicarbonate, caustic soda and finally soda ash crystals. The crystalline products each have separate applications and advantages as final saleable products while the sodium carbonate solution is useful as a raw material when making other sodium-based chemicals such as sodium hydroxide or sodium phosphate.

d. The instant process, which permits a plant to produce different precursor crystals, permits several grades of soda ash to be readily produced. For example, a very low density soda ash can be produced by direct low temperature drying of the decahydrate crystals. A high density soda ash is obtainable from the sodium carbonate monohydrate. Also, a very high purity soda ash from the instant monohydrate crystallization step can be obtained without additional alkali losses.

e. The instant process permits recovery of what would usually be considered waste streams, which do not have enough alkali values or which have unacceptable impurity levels for processing by conventional technology. These waste streams can be used as solvent in the solution mining step to take on additional alkali values and can be employed as the feed brine to the instant process. The crystallization of sodium carbonate decahydrate permits recovery of purified crystals with a major proportion of impurities concentrated in the final mother liquor. This facilitates disposal because the impurities are concentrated and the concentrated waste solutions are easier to dispose of than 20 more dilute ones.

EXAMPLE 1

Following the process as described in accordance with FIG. 2, the following is a material balance for a plant producing 100 K lbs per hour of soda ash products.

The units are expressed as thousand pounds per hour (K lbs/h) or in gallons per minute (gpm).

A brine 2 obtained by contacting water with an underground trona formation at about 20° C. and having the composition listed in Table II is fed at a rate of 1187 gpm (709.35 K lbs/h) into a stripper 2A which is at a temperature of 105° C. In the stripper, 3.9 K lbs/h of $CO_2$ and 251 K lbs/h of steam are removed from line 3 and compressed to provide heat for the evaporator 6A. Stripper discharge liquor is removed from pipe 4 in amounts of 709 K lbs/h. This liquor is split into two streams with 70 K lbs/h going via line 5 to muds repulper 12A in the causticizing circuit, and with the remainder of 640 K lbs/h going via line 6 into evaporator 6A which is at a temperature of about 115° C. In evaporator 6A, 1.7 K lbs/h of $CO_2$ and 255 K lbs/h of $H_2O$ are evolved and passed into stripper 2A via line 7 to supply steam to the stripper 2A. The evaporator liquid discharge stream 8 totalling 383 K lbs/h is sent to neutralizer 8A.

The stripped brine in line 5 is mixed with muds in muds repulper 12A, is passed via line 16 into clarifier 16A and the clarified liquor is passed via line 19 into slaker-causticizerr 19A, reacted with 6.4 K lbs/h of lime in slaker-causticizer 19A to produce an 8% by weight caustic soda solution which is passed via line 11 into clarifier 13A and clarified. The muds from clarifier 13A is sent to repulper 12A via line 12 while the clarified caustic soda solution of about 8% NaOH is sent to neutralizer 8A via line 13. The neutralized stream in line 20 in the amount of 470 K lbs/h is sent to the deca combined feed tank 20A where it is mixed with 48 K lbs/h of recycle monohydrate mother liquor from line 45. This solution of essentially sodium carbonate from tank 20A is passed through line 21 in amounts of 519 K lbs/h and sent to the first crystallizer 21A where evaporative cooling of the stream takes place. Water vapor in amounts of 29 K lbs/h is evaporated and condensed while sodium carbonate decahydrate crystals are formed at a temperature of 24° C. in the crystallizer 21A. The crystal slurry is removed through line 24 and separated in centrifuge 24A to yield 210 K lbs/h of decahydrate crystals removed, after washing, via line 27 and 314 K lbs/h of decahydrate mother liquor removed via line 26 and fed to a second decahydrate crystallizer 26A. Water vapor is evaporated in amounts of 15 K lbs/h from crystallizer 26A, removed via line 28 and condensed while additional temperature of 13° C. in crystallizer 26A. The crystal slurry is removed through line 30 and is separated in centrifuge 30A into 132 K lbs/h of decahydrate crystals. These are removed, after washing, via line 35 and 189 K lbs/h of mother liquor is removed via line 32 and purged via line 33. The two decahydrate crystal streams 27 and 35 totalling about 341 K lbs/h of sodium carbonate decahydrate are fed to the decahydrate dissolver tank 35A where 33 K lbs/h of water is added via line 37 and the crystals dissolved at a temperature of 50° C. to produce about a 30 weight percent aqueous solution of sodium carbonate. No caustic is required to be added via line 36 because essentially no bicarbonate values is present in the solution in dissolver 35A. The sodium carbonate solution is removed from decahydrate dissolver 35A in amounts of 374 K lbs/h at a temperature of about 50° C. and is fed via line 38 into a sodium carbonate monohydrate crystallizer 38A. If desired, part of the 30% sodium carbonate solution can also be employed to produce sodium phosphates, but in this example all is sent to the monohydrate crystallizer 38A. About 228 K lbs/h of water are evaporated from crystallizer 38A, are removed via line 39 and condensed. Sodium carbonate monohydrate crystals are precipitated and yield a monohydrate crystal slurry of 146 K lbs/h which is sent via line 41 to a centrifuge 41A to separate crystals from their mother liquor. The monohydrate mother liquor is recycled along with wash liquor at a rate of 48 K lbs/h via line 45 to the combined decahydrate feed tank 20A. The crystals, after being washed with water from line 42, are passed via line 44 into a heated fluid bed where they are calcined at a bed temperature of 140° C. into 100 K lbs/h of soda ash by removal of 27 K lbs/h of water. This yield of soda ash constitutes a production of about 390 K tons per year.

Example 1 has a material balance for the various process streams listed in Table II which does not include additives such as defoamers, crystal growth modifiers or other additives, or heat exchangers required for heat conservation in order to simplify the flow diagram, because these elements are known to those skilled in the art.

While various modifications of the process have been described, other modifications may be made in the process to optimize results, have continuous or batch operations, and other such changes, without departing from the spirit of the invention or scope thereof.

TABLE II

| | I.D. | K lbs/h | Temp °C. | Na₂CO₃ K lbs/h | Na₂CO₃ Wt % | NaHCO₃ K lbs/h | NaHCO₃ Wt % | NaCl K lbs/h | NaCl Wt % | Na₂SO₄ K lbs/h | Na₂SO₄ Wt % | H₂O K lbs/h | H₂O Wt % |
|---|---|---|---|---|---|---|---|---|---|---|---|---|---|
| Feed Brine | 2 | 709.53 | 20 | 99.3 | 14.0 | 31.9 | 4.5 | 6.38 | 0.9 | 2.84 | 0.4 | 568.89 | 80.2 |
| Stripper Vapor | 3 | 255.0 | 105 | — | — | — | — | — | — | — | — | 251.1 | 98.5 |
| Stripper Discharge | 4 | 709.32 | 105 | 104.5 | 14.74 | 31.9 | 3.33 | 6.38 | 0.9 | 2.83 | 0.4 | 571.9 | 80.6 |
| Discharge to Causticizer | 5 | 69.65 | 105 | — | — | — | — | — | — | — | — | — | — |
| Discharge to Evaporator | 6 | 639.66 | 105 | — | — | — | — | — | — | — | — | — | — |
| Evaporator Exit Gas | 7 | 256.7 | 115 | — | — | — | — | — | — | — | — | 254.99 | 99.3 |
| Evaporator Discharge | 8 | 382.9 | 115 | 98.45 | 25.71 | 14.67 | 3.83 | 5.76 | 1.50 | 2.56 | 0.67 | 261.48 | 68.3 |
| Clarified Caustic Solution | 13 | 87.37 | 90 | 1.23 | 1.4 | 0 | 0 | 0.51 | 0.64 | 0.25 | 0.29 | 78.3 | 89.7 |
| Deca Feed | 21 | 518.7 | 80 | 130.5 | 25.2 | 0 | 0 | 6.40 | 1.23 | 3.19 | 0.62 | 378.6 | 73.0 |
| Deca Crystals | 27 | 209.5 | 24 | 68.0 | 32.5 | 0 | 0 | 0.046 | 0.02 | 0.206 | 0.10 | 141.25 | 67.4 |
| 1st Deca Mother Liquor | 26 | 314.35 | 24 | 62.5 | 19.9 | 0 | 0 | 6.36 | 2.02 | 2.98 | 0.95 | 242.75 | 77.2 |
| 2nd Deca Crystals | 35 | 131.7 | 13 | 44.26 | 33.6 | 0 | 0 | 0.046 | 0.04 | 0.192 | 0.15 | 87.22 | 66.2 |
| 2nd Deca Mother Liquor | 32 | 188.5 | 13 | 18.35 | 9.7 | 0 | 0 | 6.31 | 3.35 | 2.79 | 1.48 | 161.32 | 85.6 |
| Mono Crystallizer Feed | 38 | 374.39 | 50 | 112.28 | 30 | 0 | 0 | 0.092 | 0.02 | 0.398 | 0.11 | 261.6 | 69.9 |
| Mono Slurry | 41 | | | | | | | | | | | | |
| Crystals | | 122.8 | 100 | 105.0 | 85.5 | 0 | 0 | — | — | — | — | 17.83 | 14.5 |
| Solution | | 23.57 | 100 | 7.26 | 30.8 | 0 | 0 | 0.092 | 0.39 | 0.398 | 1.69 | 15.81 | 67.1 |
| Soda Ash | 47 | 100 | — | 99.98 | 100 | 0 | 0 | 0.004 | 0.0038 | 0.015 | 0.0147 | 0 | 0 |

We claim:

1. Process for providing sodium-based chemicals from a brine containing sodium carbonate and sodium bicarbonate which comprises heating the brine at a temperature of about 100° C. to about 140° C. to evaporate water, convert sodium bicarbonate to sodium carbonate and to drive off resulting carbon dioxide therefrom, reacting the resulting brine having a reduced sodium bicarbonate content with an aqueous sodium hydroxide solution in amounts to convert essentially all of the remaining sodium bicarbonate in the resulting brine to sodium carbonate, cooling the sodium hydroxide-treated brine to a temperature of about 5° C. to about 25° C., precipitating sodium carbonate decahydrate crystals, separating sodium carbonate decahydrate crystals from their mother liquor, melting separated crystals of sodium carbonate decahydrate to form a sodium carbonate solution, heating the resulting sodium carbonate solution to a temperature of above about 60° C. to below about 110° C. to evaporate water, precipitating sodium carbonate monohydrate crystals, separating the sodium carbonate monohydrate crystals from their mother liquor, calcining separated crystals of sodium carbonate monohydrate to produce soda ash and recovering the soda ash.

2. Process of claim 1 wherein said brine is obtained by contact of water with an underground trona formation.

3. Process of claim 2 wherein water is introduced underground as a solution mining solvent in contact with the underground trona formation.

4. Process of claim 1 wherein the brine is mine water in contact with trona formations.

5. Process of claim 3 wherein said solution mining is carried out by employing an aqueous solvent at a temperature no higher than about 35° C.

6. Process of claim 3 wherein the solution mining is carried out at the ambient temperature of the trona formation.

7. Process of claim 3 wherein the solution mining is carried out by employing an aqueous solvent at a temperature of about 15° C. to about 22° C.

8. Process of claim 1 wherein a portion of said sodium carbonate solution formed by heating said crystals of sodium carbonate decahydrate is separated and recovered for use in manufacturing sodium-based chemicals.

9. Process of claim 1 wherein mother liquor separated from said sodium carbonate decahydrate is purged to remove impurities from the process.

10. Process of claim 1 wherein mother liquor separated from said sodium carbonate decahydrate is purged in part to prevent impurities build up while the remaining part is recycled to a causticization circuit in which said sodium hydroxide is produced by causticizing sodium carbonate values.

11. Process of claim 1 wherein mother liquor separated from the sodium carbonate monohydrate crystals is recycled back and mixed with the sodium carbonate solution being evaporated to produce sodium carbonate monohydrate crystals.

12. Process of claim 1 wherein mother liquor separated from the sodium carbonate monohydrate crystals is recycled and mixed with evaporated solution being cooled to crystallize sodium carbonate decahydrate.

13. Process of claim 1 wherein said brine is first heated with steam in a stripping stage to strip off some carbon dioxide and the stripped brine is subsequently heated in an evaporating stage to evaporate water therefrom and drive off additional carbon dioxide.

14. Process of claim 13 wherein the stripped brine is employed as the brine to a causticizing step.

15. Process of claim 1 wherein a portion of the same brine solution fed to the evaporation stage is also fed to a causticizing step.

16. Process of claim 1 wherein said solution of sodium carbonate formed by melting crystals of sodium carbonate decahydrate is in part separated and heated at temperatures above about 100° C. to evaporate water and crystallize sodium carbonate anhydrous crystals, separating and recovering the crystals from their mother liquor.

17. Process of claim 1 wherein said solution of sodium carbonate formed by melting crystals of sodium carbonate decahydrate is in part separated and carbonated to crystallize sodium bicarbonate crystals, separating and recovering the crystals from their mother liquor.

18. Process of claim 1 wherein said solution of sodium carbonate formed by melting crystals of sodium carbonate decahydrate is in part separated and reacted with lime to form caustic soda as a product.

19. Process of claim 1 wherein said brine or evaporated brine is carbon treated to remove organic impurities before being cooled and crystallizing crystals therefrom.

20. Process of claim 1 wherein the brine being causticized by reaction with calcium oxide or calcium hydroxide has a TA concentration not above 20%.

21. Process of claim 1 wherein said sodium hydroxide is produced by introducing a sodium carbonate containing-brine into a muds repulping stage where it is mixed with muds from a first clarifying stage, clarifying the resulting mixture of brine and muds in a second clarifying stage, introducing the clarified liquor from the second clarifying stage into a slaking stage, reacting lime with the sodium carbonate values in the brine to form a slurry of sodium hydroxide and calcium carbonate muds, introducing the slurry from the slaking stage into a first clarifying stage, clarifying the aqueous sodium hydroxide solution from the muds, passing the separated muds to a muds repulping stage, separating the clarified aqueous sodium hydroxide solution for use in the neutralization stage of the process.

22. Process of providing valuable sodium-based chemicals from a brine containing sodium carbonate and sodium bicarbonate that is obtained by contact of water with an underground trona formation and which has a total alkali value of from about 8% to about 20% which comprises heating the brine at a temperature of about 100° C. to about 140° C. to evaporate water, convert sodium bicarbonate to sodium carbonate and to drive off resulting carbon dioxide therefrom, reacting the resulting brine having a reduced sodium bicarbonate content with an aqueous sodium hydroxide solution in amounts to convert essentially all of the remaining sodium bicarbonate in the resulting brine to sodium carbonate, said aqueous sodium hydroxide solution being formed by causticizing sodium carbonate values with calcium oxide or calcium hydroxide, cooling the sodium hydroxide-treated brine to a temperature of about 5° C. to about 25° C., precipitating sodium carbonate decahydrate crystals, separating sodium carbonate decahydrate crystals from their mother liquor, melting separated crystals of sodium carbonate decahydrate to form a sodium carbonate solution, heating the resulting sodium carbonate solution to a temperature of above about 60° C. to below about 110° C. to evaporate water, precipitating sodium carbonate monohydrate crystals, separating the sodium carbonate monohydrate crystals from their mother liquor, calcining separated crystals of sodium carbonate monohydrate to produce soda ash and recovering the soda ash.

23. Process for producing valuable sodium-based chemicals from a brine containing sodium carbonate and sodium bicarbonate which comprises contacting the brine with steam to heat it in a stripper stage to convert sodium bicarbonate to sodium carbonate and to strip off some resulting carbon dioxide therefrom, passing a portion of the stripped brine to an evaporating stage and heating it further at a temperature of about 100° C. to about 140° C. to evaporate water, convert additional sodium bicarbonate to sodium carbonate and to drive off additional resulting carbon dioxide therefrom, reacting the resulting evaporated brine having a reduced sodium bicarbonate content with an aqueous sodium hydroxide solution in amounts to convert essentially all of the remaining sodium bicarbonate in the evaporated brine to sodium carbonate, said aqueous sodium hydroxide solution being formed by causticizing the remaining portion of stripped brine with calcium oxide or calcium hydroxide, cooling the sodium hydroxide-treated brine to a temperature of about 5° C. to about 25° C., precipitating sodium carbonate decahydrate crystals, separating sodium decahydrate crystals from their mother liquor, melting separated crystals of sodium carbonate decahydrate to form a sodium carbonate solution, heating the resulting sodium carbonate solution to a temperature of above about 60° C. to below about 100° C. to evaporate water, precipitating sodium carbonate monohydrate crystals, separating the sodium carbonate monohydrate crystals from their mother liquor, calcining separated crystals of sodium carbonate monohydrate to produce soda ash and recovering the soda ash.

24. Process for producing valuable sodium-based chemicals from a brine containing sodium carbonate and sodium bicarbonate that is obtained by contact of water with an underground trona formation and which has a total alkali value of from about 8% to about 20% which comprises contacting the brine with steam to heat it in a stripper stage to convert sodium bicarbonate to sodium carbonate and to strip off some resulting carbon dioxide therefrom, passing a portion of the stripped brine to an evaporating stage and heating it further at a temperature of about 100° C. to about 140° C. to evaporate water, convert additional sodium bicarbonate to sodium carbonate and to drive off additional resulting carbon dioxide therefrom, reacting the resulting evaporated brine having a reduced sodium bicarbonate content with an aqueous sodium hydroxide solution in amounts to convert essentially all of the remaining sodium bicarbonate in the evaporated brine to sodium carbonate, said aqueous sodium hydroxide solution being formed by causticizing the remaining portion of stripped brine with calcium oxide or calcium hydroxide, cooling the sodium hydroxide-treated brine to a temperature of about 5° C. to about 25° C., precipitating sodium carbonate decahydrate crystals, separating sodium decahydrate crystals from their mother liquor, melting separated crystals of sodium carbonate decahydrate to form a sodium carbonate solution, heating the resulting sodium carbonate solution to a temperature of above about 60° C. to below about 110° C. to evaporate water, precipitating sodium carbonate monohydrate crystals, separating the sodium carbonate monohydrate crystals from their mother liquor, calcining separated crystals of sodium carbonate monohydrate to produce soda ash and recovering the soda ash.

25. Process of claim 23 wherein mother liquor separated from the sodium carbonate monohydrate crystals is recycled and mixed with evaporated brine being cooled to crystallize sodium carbonate decahydrate.

26. Process of claim 23 wherein said brine is obtained by contact of water with an underground trona formation.

27. Process of claim 23 wherein water is introduced underground as a solution mining solvent in contact with the underground trona formation.

28. Process of claim 23 wherein the brine is mine water in contact with trona formations.

29. Process of claim 27 wherein the solution mining is carried out at the ambient temperature of the trona formation.

30. Process of claim 27 wherein the solution mining is carried out by employing an aqueous solvent at a temperature of about 15° C. to about 22° C.

31. Process of claim 23 wherein said solution of sodium carbonate formed by melting crystals of sodium carbonate decahydrate is in part separated and heated at temperatures above about 110° C. to evaporate water and crystallize sodium carbonate anhydrous crystals, separating and recovering the crystals from their mother liquor.

32. Process of claim 23 wherein said solution of sodium carbonate formed by melting crystals of sodium carbonate decahydrate is in part separated and carbonated to crystallize sodium bicarbonate crystals, separating and recovering the crystals from their mother liquor.

33. Process of claim 23 wherein said solution of sodium carbonate formed by melting crystals of sodium carbonate decahydrate is in part separated and reacted with lime to form caustic soda as a product.

34. Process of claim 23 wherein the brine being causticized by reaction with calcium oxide or calcium hydroxide has a TA concentration not above 20%.

35. Process of claim 23 wherein said sodium hydroxide is produced by introducing a sodium carbonate containing-brine into a muds repulping stage where it is mixed with muds from a first clarifying stage, clarifying the resulting mixture of brine and muds in a second clarifying stage, introducing the clarified liquor from the second clarifying stage with a slaking stage, reacting lime with the sodium carbonate values in the brine to form a slurry of sodium hydroxide and calcium carbonate muds, introducing the slurry from the slaking stage into a first clarifying stage, clarifying the aqueous sodium hydroxide solution from the muds, passing the separated muds to a muds repulping stage, separating the clarified aqueous sodium hydroxide solution for use in the neutralization stage of the process.

* * * * *

UNITED STATES PATENT AND TRADEMARK OFFICE
CERTIFICATE OF CORRECTION

PATENT NO. : 5,283,054
DATED : February 1, 1994
INVENTOR(S) : William C. Copenhafer, David E. Smith and Gerald F. Niedringhaus It is certified that error appears in the above—identified patent and that said Letters Patent is hereby corrected as shown below:

Column 1, line 52, "($Na_2CO_3 \cdot HaHCO_3 \cdot 2H_2O$)," should read --($Na_2CO_3 \cdot NaHCO_3 \cdot 2H_2O$),--. Column 6, line 11, "vent" should read --solvent--. Column 7, lines 27-28, "5,043,149 issued et al" should read --5,043,149 issued to W. R. Frint et al--. Column 8, line 63, "percent 5 weight" should read --percent $\pm$ 5 weight--. Column 9, line 21, "II," should read --II),--; line 64, "I and II," should read --I) and II),--. Column 12, line 35, "tone" should read --ton--. Column 19, line 24, "than 20 more" should read --than more--; line 59, "slaker-causticizerr" should read --slaker-causticizer--. Column 20, line 16, "additional temperature" should read --additional sodium carbonate decahydrate crystals are formed at a temperature--.

Signed and Sealed this

Ninth Day of August, 1994

Attest:

Attesting Officer

BRUCE LEHMAN
Commissioner of Patents and Trademarks